(12) United States Patent
Gonzalez et al.

(10) Patent No.: US 12,460,179 B2
(45) Date of Patent: Nov. 4, 2025

(54) LYOPHILIZED COMPOSITIONS CONTAINING UMBILICAL CORD LINING STEM CELLS CONDITIONED MEDIUM

(71) Applicant: RESTEM LLC, Miami, FL (US)

(72) Inventors: Rafael Gonzalez, Yorba Linda, CA (US); Toai Nguyen, Aliso Vijeo, CA (US)

(73) Assignee: RESTEM LLC, Miami, FL (US)

( * ) Notice: Subject to any disclaimer, the term of this patent is extended or adjusted under 35 U.S.C. 154(b) by 0 days.

(21) Appl. No.: 17/501,775

(22) Filed: Oct. 14, 2021

(65) Prior Publication Data

US 2022/0033772 A1    Feb. 3, 2022

Related U.S. Application Data

(60) Division of application No. 17/390,574, filed on Jul. 30, 2021, which is a continuation-in-part of
(Continued)

(51) Int. Cl.
*C12N 5/0775* (2010.01)
*C12N 5/0735* (2010.01)

(52) U.S. Cl.
CPC ......... *C12N 5/0606* (2013.01); *C12N 5/0665* (2013.01); *C12N 2501/10* (2013.01);
(Continued)

(58) Field of Classification Search
CPC ............... C12N 5/0606; C12N 5/0665; C12N 2502/025; C12N 2501/10; C12N 2501/165; C12N 2501/125; C12N 2501/13; C12N 2501/21; C12N 2501/2304; C12N 2501/2307; C12N 2501/23; C12N 2501/2303; C12N 2501/2306; C12N 2501/2308; C12N 2501/2318; C12N 2501/25; C12N 2533/54; C12N 2533/90

See application file for complete search history.

(56) References Cited

U.S. PATENT DOCUMENTS 8,778,679 B2 * 7/2014 Silva ............... C12N 5/0605
                                                435/374
2008/0292597 A1   11/2008 Steenblock
(Continued)

FOREIGN PATENT DOCUMENTS

WO    WO2008/082525    7/2008

OTHER PUBLICATIONS

Sushma Chaubey et al., Early gestational mesenchymal stem cell secretome attenuates experimental bronchopulmonary dysplasia in part via exosome-associated factor TSG-6, 2018, Stem Cell Research & Therapy, vol. 9, No. 173, pp. 1-26 (Year: 2018).*

(Continued)

*Primary Examiner* — David W Berke-Schlessel
*Assistant Examiner* — Trent R Clarke
(74) *Attorney, Agent, or Firm* — Gleason & Bigonger LLP; Darius Gleason, Esq.

(57) ABSTRACT

Factor rich compositions produced from umbilical cord (UC) mesenchymal stem cells (MSCs) are described. Secretory UC MSCs in serum free culture conditions produce a factor rich conditioned medium which may be concentrated and filtered to obtain clinical grade products.

6 Claims, 11 Drawing Sheets

Related U.S. Application Data application No. 17/205,910, filed on Mar. 18, 2021, which is a division of application No. 15/248,629, filed on Aug. 26, 2016, now abandoned.

(60) Provisional application No. 62/213,537, filed on Sep. 2, 2015.

(52) U.S. Cl.
CPC .... *C12N 2501/11* (2013.01); *C12N 2501/115* (2013.01); *C12N 2501/125* (2013.01); *C12N 2501/13* (2013.01); *C12N 2501/148* (2013.01); *C12N 2501/15* (2013.01); *C12N 2501/165* (2013.01); *C12N 2501/17* (2013.01); *C12N 2501/21* (2013.01); *C12N 2501/22* (2013.01); *C12N 2501/23* (2013.01); *C12N 2501/2303* (2013.01); *C12N 2501/2304* (2013.01); *C12N 2501/2306* (2013.01); *C12N 2501/2307* (2013.01); *C12N 2501/2308* (2013.01); *C12N 2501/2318* (2013.01); *C12N 2501/25* (2013.01); *C12N 2502/025* (2013.01); *C12N 2533/54* (2013.01); *C12N 2533/90* (2013.01)

(56) References Cited

U.S. PATENT DOCUMENTS

| 2010/0143289 A1* | 6/2010 | Cohen | A61K 8/365 514/474 |
|---|---|---|---|
| 2012/0021509 A1 | 1/2012 | Kang | |
| 2012/0142102 A1 | 6/2012 | Chen | |
| 2012/0195969 A1* | 8/2012 | Riordan | A61K 9/06 424/583 |
| 2018/0163177 A1* | 6/2018 | Lo | C12N 5/0665 |
| 2020/0010802 A1* | 1/2020 | Castell Rodríguez | A61L 27/3641 |
| 2023/0072523 A1* | 3/2023 | Glozman | A61K 9/5184 |
| 2023/0190818 A1* | 6/2023 | Jurga | C12N 5/0663 424/93.7 |

OTHER PUBLICATIONS

Document "DMEM—F-12 composition" is a pdf of the webpage at https://www.thermofisher.com/us/en/home/technical-resources/media-formulation.55.html, accessed Jan. 25, 2022 (Year: 2022).*

Feng-Juan LV, Rocky S. Tuan, Kenneth M.C. Cheung, Victor Y.L. Leung, Concise Review: The Surface Markers and Identity of Human Mesenchymal Stem Cells, 2014, vol. 32, pp. 1408-1419 (Year: 2014).*

Subramanian, Comparative Characterization of Cells from the Various Compartments of the Human Umbilical Cord Shows that the Wharton's Jelly Compartment Provides the Best Source of Clinically Utilizable Mesenchymal Stem Cells, PLOS One, USA, Jun. 10, 2015.

Shen, Conditioned medium from umbilical cord mesenchymal stem cells induces migration and angiogenesis Molecular Medicine Report, Spandidos, Athens, Greece, Jul. 2015; 12(1):20-30.

* cited by examiner

FIG. 1

U: Medium from umbilical cord lining stromal cell culture
B: Medium from bone marrow mesenchymal stromal cell culture
1: 2% FBS medium
2: No serum medium
3, 6, 9: Medium collected at days 3, 6 and 9, respectively

Collagen I & III Content Assay

| | Collagen I & III Contents mg/ml |
|---|---|
| Sample A: Conditioned medium, neat (Lot 121914BB) | 0.281 |
| Sample B: Sample A, 10-fold concentrated (Lot 121914BB) | 0.961 |
| Sample C: Sample B, filtered (Lot 121214BA) | 0.883 |

LYOPHILIZED COMPOSITIONS CONTAINING UMBILICAL CORD LINING STEM CELLS CONDITIONED MEDIUM

INCORPORATION BY REFERENCE TO ANY PRIORITY APPLICATIONS

This application is a divisional of U.S. patent application Ser. No. 17/390,574 filed Jul. 30, 2021 which claims the benefit of priority to U.S. patent application Ser. No. 17/205,910 filed Mar. 18, 2021 which application claims the benefit of priority to U.S. patent application Ser. No. 15/248,629 filed Aug. 26, 2016 which application claims the benefit of U.S. Provisional Application No. 62/213,537 filed Sep. 2, 2015, all of whose disclosures are incorporated by reference in their entirety for all purposes.

BACKGROUND

Field

This disclosure relates generally to products derived from mesenchymal stem cells (MSCs) and the conditioned cell culture medium (CM) thereof. More specifically, this disclosure is related to the efficient and reliable production of a factor rich product from the conditioned medium of MSCs isolated from the umbilical cord (UC).

Description of Related Art

Mesencyhymal stem cells, also known as a mesenchymal stromal cells, are a strategic cell type in translational medicine because they have proven relatively safe in clinical studies, may be obtained from non-embryonic sources, and have great therapeutic potential. MSCs were first discovered in bone marrow (BM) and this continues to be a primary source for the cells. (Friedenstein A J, et al., *The Development of Fibroblast Colonies in Monolayer Cultures of Guinea-Pig Bone Marrow and Spleen Cells*. Cell Tissue Kinet. 1970; 3:393-403). However because a sample from the inner bone is required to derive these MSCs, other less invasive sources of MSCs have been located in fat as well as in cartilage, muscle and teeth. An even less invasive source of MSCs is the umbilical cord. Umbilical cord derived MSCs have great therapeutic potential because of their neonatal source.

MSCs from multiple tissues have been studied in treatment of bone fractures, osteoarthritis and rheumatoid arthritis, graft versus host disease, Crohn's disease, amyotrophic lateral sclerosis, and myocardial infarction, ischemic stroke, liver and kidney failure to name a few (Levy, O., et al, *Shattering barriers toward clinically meaningful MSC therapies*. Sci. Adv. 2020; eaba6884 22 Jul. 2020). Much of this work relied upon systemic infusion of bone marrow derived cells. To date, MSCs have shown the greatest clinical potential in treatment of conditions related to inflammation because of their immunomodulatory characteristics. However the full potential of MSCs in topical or local applications such as for lacerations or burns remains unrealized.

MSCs are formally defined by standardized criteria: adherent in cell culture; express markers CD90, CD73, and CD105; test negative for hematopoietic markers CD34, CD45, markers for monocytes, macrophages, and lymphocytes; and able to differentiate in vitro into osteoblasts, adipocytes and chondroblasts under standard culture conditions (Dominici et al., *Minimal criteria for defining multipotent mesenchymal stromal cells. The international society for cellular therapy position statement. Cytotherapy.* 2006; 8(4):315-317). Despite these clear criteria for MSC identification, translational applications of MSCs remain limited by inconsistent reproducibility. One reason for this inconsistency is the considerable heterogeneity in the MSCs and procedures that have been tested including variation in the age and health of MSC donors, tissue source, method of isolation, method of cryopreservation, method of cell culture and method of scale up to clinically relevant population sizes, as well as in potency and quality assays. Attempts at standardizing or improving MSCs by genetic modification, derivation from embryonic cells and through reprogramming further add to the heterogeneity of MSCs under study.

Another approach to translating MSCs into effective therapy is based upon their secretion of soluble factors into cell culture medium, known as conditioned medium. These soluble factors consist of a range of growth factors, cytokines and other cell signaling molecules. In some cases MSCs that secrete factors into conditioned medium also secrete them within extracellular vesicles and exosomes.

The presence of secreted soluble factors and exosomes in MSC conditioned medium presents an opportunity to make biologic treatments from MSCs as an alternative to MSC cellular transplantation therapy. Unlike whole cells, conditioned medium typically provokes a reduced immune response and poses less risk of oncogenesis.

SUMMARY

For purposes of summarizing the disclosure and the advantages achieved over the prior art, certain objects and advantages of the disclosure are described herein. Not all such objects or advantages may be achieved in any particular embodiment. Thus for example, those skilled in the art will recognize that the invention may be embodied or carried out in a manner that achieves or optimizes one advantage or group of advantages as taught herein without necessarily achieving the other objects or advantages has may be taught or suggested herein.

In one aspect, a factor rich product derived from UC MSCs is described. The product is sterile, completely free of serum products and exogenous growth factors, and has a high concentration of exosomes. The product also includes quantities of soluble growth factors, cytokines and chemokines as well as significant amounts of glycosaminoglycans (GAGs) and collagen I and III content.

In some embodiments the product contains exosomes recovered from conditioned medium at a concentration of between about 22,590, 430,000 particles/ml and 22,609,570,000 particles/ml.

In some embodiments the product contains exosomes recovered from conditioned medium ranging in size between about 50 and 500 nm and averaging 133.4 nm.

In some embodiments, the product includes Stem Cell Factor (SCF) recovered from conditioned medium at about 20 to 50 picograms (pg)/ml and Vascular Endothelial Growth Factor (VEGF) recovered at concentrations of about 200 to 1200 pg/ml.

In some embodiments, the product includes cytokines and chemokines recovered from conditioned medium which are also found in BM CM including Interferon gamma, (INF-γ) and Interleukins (IL) 3, 6, 18.

In some embodiments the product includes cytokines and chemokines recovered from conditioned medium which are not found in BM CM including IL-4 7, 8 as well as, Macrophage Inflammatory Protein 1 beta (MIP1β), monocyte chemoattractant protein-1 (MCP-1) and Tumor Necrosis Factor alpha (TNFα).

In some embodiments the product includes cytokines and chemokines recovered from conditioned medium which are found at lower levels in BM CM including IL-4 7, 8 as well as, Macrophage Inflammatory Protein 1 beta (MIP1β), monocyte chemoattractant protein-1 (MCP-1) and Tumor Necrosis Factor alpha (TNFα).

In some embodiments the product contains Chondroitin Sulfate (CS) and Hyaluronic Acid (HA). In some embodiments HA may be recovered from CM at up to about 1 microgram (ug)/ml.

In an embodiment, the HA recovered is of high molecular weight at about 2500 kilodaltons (kDa).

In an embodiment, the product contains Collagen I and III recovered from CM at about 0.281 milligrams (mg)/ml.

In an alternative embodiment the factor rich product is not completely free of animal serum and growth factors.

In an embodiment, inclusion of between about 5-20 nanograms (ng) of Fibroblast Growth Factor-2 (FGF-2) in conditioned medium enables recovery of increased levels of Nerve Growth Factor (NGF), SCF and VEGF.

In an embodiment the product may be provided in a liquid state.

In an embodiment the product may be provided in a frozen state.

In an embodiment the product may be provided in a lyophilized state.

In another aspect, a process for making a factor rich product is described. The process includes providing a mesenchymal stem cell derived from umbilical cord, wherein the UC MSCs are secretory, propagating the UC MSCs under expansion conditions until nearly confluent, then propagating the UC MSCs in serum free, growth factor free conditions, collecting and replacing conditioned medium at regular intervals, pooling the collected conditioned medium, then filtering and concentrating the conditioned medium to remove aggregates and sterilize.

In some embodiments, the cells may be MSCs derived from any structure in the umbilical cord selected from the group consisting of Wharton's Jelly, amnion, subamnion, amniotic epithelia, placenta, perivascular cells, cord blood or combinations thereof.

In some embodiments the UC MSCs selected may be mammalian or human.

In some embodiments, the UC MSCs selected are umbilical cord lining stem cells (ULSCs).

In some embodiments, other forms of cellular stress such as hypoxia could be used as alternative to serum and growth factor free medium.

In some embodiments, the process further comprises using serum and growth factors to increase production of certain soluble factors.

In some embodiments, FGF-2 may be added to conditioning medium at between about 5-20 ng in addition to 15% FBS to increase the amounts of NGF, SCF and VEGF recoverable.

In some embodiments the process further comprises extracting HA from an UC MSCs layer to increase the amount of HA recoverable. In some embodiments the process further comprises adding HA extracted from a UC MSCs layer to the pooled conditioned medium.

In some embodiments the process further comprises filtering the pooled conditioned medium to remove large aggerates and sterilize.

In some embodiments the filtration pore size may be between about 100 um and 220 nm.

In some embodiments the conditioned medium may be filtered an additional number of times over filters of identical or varying pore sizes.

In one embodiment the process further comprises filtering pooled conditioned medium three times in the following sequence: 0.45 um filter, 0.22 um filter, 0.22 um filter.

In some embodiments the three-step filtration may be performed serially in a single step.

In some embodiments the filtered conditioned medium may be stored as a liquid at 4° C.

In some embodiments the filtered conditioned medium may be frozen.

In some embodiments the filtered conditioned medium may lyophilized.

In another aspect, a process for using a factor rich product to treat the symptoms of aging in skin, cutaneous wound healing, and hair growth is described. The process includes providing a factor rich product in concentrated liquid or lyophilized form, mixing a suitable carrier or diluent with the factor rich product, topically applying that mixture to aged, wounded or hairless skin and thereby increasing the stored and secreted forms of collagen and elastin in treated skin.

In some embodiments the factor rich product is provided at about 5-20% of the mixture with diluent. The formulation may contain ULSC secreted products between .001 and 100% of weight/volume. It may be used for cosmetic, skin care, over the counter or prescription products. It may treat aging, wrinkling, pigmentation, thickness, preventing atrophy, preventing dark circles under the eyes, preventing sallow colored skin, sagging, smoothing of lips, preventing itching, improving texture and color, for example. Both prophylactic and therapeutic. For cosmetic applications the media is mixed with a gelling agent. The secreted products can be provided in a composition carrying a dermatological carrier. Carriers include emollients, emulsifiers, diluents, preservatives, solubilizers or hydrogel. Other ingredients commonly used in skin care products are absorbents, abrasives, anticaking agents, antifoaming agents, antioxidants, binders, biological additives, buffering agents, bulking agents, chelating agents, chemical additives, colorants, cosmetic astringents, cosmetic biocides, denaturants, drug astringents, external analgesics, film formers, fragrance compounds, humectants, opacifying agents, pH adjusters, plasticizers, preservatives, propellants, reducing agents, skin bleaching agents, skin conditioning agents, skin protectants, solvents, foam boosters, hydrotropes, sunscreen agents, uv light absorbers, waterproofing agents, and viscosity increasing agents. The amount of water in the emulsion can range between 15-95 percent by weight, typically closer to 60-75%. Emollients are oily substances which smooth and soften skin. Typical emollients have a viscosity in the range of 50-500 centipoise including lanolin oil, coconut oil, cocoa butter, olive oil, almond oil, macadamia nut oil, aloe extracts, safflower oil, corn oil, cottonseed oil and peanut oil. Emollients may be present from about 1-10% by weight. There are many more emollients that can be used. Humectants are moisturizing agents that promote retention of water due to hygroscopic property. Examples include glycerin, polyethylene glycol, mannitol, and sorbitol. Typically are between 1-10% by weight. Waterproofing and water resistance agents are a hydrophobic material that imparts a film forming characteristic to an emulsion. Typical agents are vinyl pyrollidone and eicosene and dodecane monomers. Also polyurethane. They are used in amounts sufficient to allow the formulation to remain effective on the skin after exposure to water for at least 40 minutes An antimicrobial preservative is a substance or preparation which blocks the growth of microorganisms in the preparation. Typical preservatives include the lower alkyl esters of parahydroxybenzoates (parabens), methylparaben, propylparaben, isobutylparaben, benzyl alcohol, phenyl ethyl alcohol, and benzoic acid. Are typically included in an amount ranging from .001 to 10% by weight. Antioxidants may be included. Chelating Agents are used to bind metallic ions. Examples include EDTA, and are included between .001 to .2% by weight. Fragrances are aromatic substances that are extracted from plant sources including rose blossoms, gardenia flowers, jasmine flowers. Typically synthetics are used today because they are less expensive. Between .001 to about 5% by weight.)

In some embodiments the factor rich product comes into contact with skin fibroblast cells.

In another aspect a product by process is described wherein a factor rich product derived from UC MSCs is sterile, completely free of serum products and exogenous growth factors, contains a high concentration of exosomes, quantities of soluble growth factors, cytokines and chemokines as well as significant amounts of glycosaminoglycans (GAGs) and collagen I and III content; and further wherein said factor rich product is manufactured using umbilical cord lining mesenchymal stem cells (ULSCs), in the absence of all serum products and exogenous growth factors, and by one step serial filtration through 0.45 um, 0.22 um, 0.22 um filters.

All of these embodiments are intended to be within the scope of the invention herein disclosed. These and other embodiments will become readily apparent to those skilled in the art from the following detailed description of the preferred embodiments having reference to the attached figures, the invention not being limited to any particular preferred embodiment as disclosed.

DETAILED DESCRIPTION

The present disclosure relates to compositions and methods for efficient and reliable manufacture of a factor rich product from UC MSCs. One embodiment is a method for manufacturing factor rich product from UC MSCs based on the discovery that even under serum and growth factor free conditions some UC MSCs secrete considerable quantities of exosomes, certain growth factors and cytokines, hyaluronic acid, chondroitin sulfate, and collagen. This composition was discovered to have a rejuvenating effect on adult fibroblast skin cells by inducing them to produce increased levels of collagen and elastin in both stored and secreted forms.

Furthermore a clinical grade product or precursor thereto may be manufactured from UC MSCs conditioned medium by providing a filtration step to remove large particles or aggregates and sterilize the product. In one embodiment a serial filter combining 0.45 µm, 0.22 µm and 0.22 µm filters into 3 stages of a single filtration step may be used to purify and concentrate the product.

Although certain embodiments and examples are described below, those of skill in the art will appreciate that the invention extends beyond the specifically disclosed embodiments and/or uses and obvious modifications and equivalents thereof. Thus, it is intended that the scope of the invention disclosed herein should not be limited by any particular embodiments described below.

Umbilical Cord Mesenchymal Stem Cells

In the practice of the embodiments herein, human umbilical cord stem cells are used as a source of the secreted factors. Umbilical mesenchymal stem cells suitable for use in the methods and compositions described here may come from a variety of sources. Umbilical mesenchymal stem cells are reviewed in: Troyer et al., *Concise Review: Wharton's Jelly-Derived Cells are a Primitive Stromal Cell Population, Stem Cells*, 2008, 26:591-599). Any of the umbilical mesenchymal stem cells described in that document may be employed in the methods and compositions described here.

In some embodiments the UC MSCs used are umbilical cord lining stem cells (ULSCs) positive for expression of the cell surface markers CD105, CD106, CD90, CD73, SSEA-4, and STRO-1, negative for CD45, CD34, CD19, and HLA-DR, express OCT4 and Nanog, and do not express Sox2. In another aspect of the embodiment the ULSCs used are multipotent capable of differentiation into cells of mesodermal lineage (e.g., adipogenic cells, osteogenic cells, chondrogenic, and cardiogenic cells) or ectodermal lineage (e.g., neurogenic cells). In a further aspect of the embodiment, the ULSCs may undergo at least 50, 60, 70, 80 or 90 doublings in culture.

U.S. Pat. No. 8,778,679 describes a method for obtaining stem cells from an umbilical cord lining. The method comprises dissecting cord lining into longitudinal pieces of cord plated on a fibronectin coated solid substrate (e.g., a plastic culture device such as a chambered slide or culture flask). The gelatinous surface of the cord lining can be placed in contact with the fibronectin coated solid substrate while the upper surface (i.e., the surface not in contact with the fibronectin coated solid substrate) can be covered with a solid substrate such as a coverslip. Low glucose (i.e., ≤1 g/L glucose) growth medium can be added and the culture device incubated for a time sufficient for cells to migrate from the cord lining to the fibronectin coated solid substrate (e.g., 7 to 10 days). Unless otherwise indicated, cells are cultured at 37° C. in a standard atmosphere that includes 5% $CO_2$. Relative humidity is maintained at about 100%. After ULSCs have adhered to the surface of the fibronectin coated solid substrate, the coverslip can be removed, and the adhered cells can be washed in a buffer such as phosphate-buffered saline (PBS). The methods described therein may also be employed to produce UC MSCs suitable for use in the methods and compositions disclosed herein.

Production of Conditioned Medium

Conditioned medium may made by any suitable methods. In some embodiments conditioned medium may be prepared as set out in the examples. In one embodiment UC MSCs conditioned medium is obtained by first growing the cells in expansion medium to increase their population size by seeding culture vessels at density of $1 \times 10^3$ cells per $cm^2$ in a chemically defined medium, with low glucose (i.e., ≤1 g/L glucose) and up to 15% fetal bovine serum (FBS) and placing in a cell culture incubator at 37° C. in a standard atmosphere that includes 5% $CO_2$. Every three days spent medium is removed and replaced with fresh sterile expansion medium. ULSCs are propagated under these conditions until they reach 80-90% confluency typically after 1-2 weeks.

Once 80-90% confluent, expansion medium is replaced with a sterile starvation medium consisting of chemically defined serum free medium containing the reducing agent glutathione and high concentrations of vitamins, in one embodiment RPMI 1640, and free of all other proteins, lipids, or growth factors, including 0% FBS, but including 1 ml 100× Non-Essential Amino Acids (NEAA), and 1 mL L-alanyl-L-glutamine sold under the trade name 100× GlutaMAX® supplement. Starvation medium lacks the serum and glucose sources required for cellular proliferation and related metabolic activity placing the cells under stress. The culture vessels are then placed back into a cell culture incubator at 37° C. and 5% $CO_2$ so that the medium may become conditioned. Conditioned medium removed and replaced with fresh sterile conditioning medium at regular intervals thereafter, in an embodiment every 3 days. Collected medium is pooled, and stored at −20° C.

In an alternate embodiment, growth factors or serum may be used as set forth in the examples below to produce certain factors.

In an embodiment where additional HA is to be harvested, the cells may also be extracted, and the HA therefrom added to the pooled CM.

Secreted Products in UC MSCS Conditioned Medium

In one embodiment UC MSCs conditioned medium comprises a serum and exogenous growth factor free solution that is exosome and factor rich averaging about 22 billion exosomes per/ml. In some embodiments the product contains exosomes of average size 133.4 and within 1 standard deviation 68% of the exosomes are between 73-193 nm. The CM also comprises growth factors, cytokines and chemokines, and extracellular matrix components. The growth factor component consists of includes SCF recovered from conditioned medium at about 20 to 50 pg/ml and VEGF recovered from CM at concentrations of about 200 to 1200 pg/ml. The cytokine and chemokine component consists of most of the factors found in BM CM, including INF-γ, IL-3, 6, 18, but generally at lower levels, and several factors not found, or found at lower levels in BM MSC CM including GM-CSF, IL-4, 7, 8, MIP-1β, MCP-1 and TNFα. The extracellular matrix component consists of GAGs, HA and CS as well as Collagen I and III. HA may be recovered at 1 μ/ml, and at up to 2500 kilodaltons (KDa). Collagen I and III may be recovered from CM before concentration at 0.281 mg/ml.

In an embodiment, conditioned medium may also contain NGF, SCF and VEGF at elevated levels when the cell culture medium also contained 15% FBS and between about 5-20 ng of FGF-2.

Filtration of Conditioned Medium

In some embodiments conditioned medium may be purified and sterilized by filtration using any suitable procedure. In some embodiments the filtration techniques are selected from the group consisting of vacuum filtration, gravity filtration, syringe filtration, and tangential flow filtration. In one embodiment, UC MSCs conditioned medium may be filtered using a filter of pore size 0.45 μm. In another embodiment UC MSCs conditioned medium may be filtered using a filter of pore size and 0.22 μm. In some embodiments the filter membrane is selected from the group consisting of polyethersulfone (PES), polyvinylidene fluoride (PVDF), mixed cellulose esters, mixtures of cellulose acetate and cellulose nitrate, or combinations thereof. In one embodiment UC MSCs conditioned medium is syringe filtered three times with PES membranes in a single step in the following sequence: 0.45 um filter, 0.22 um filter, 0.22 um filter.

Application of Factor Rich Product

In an embodiment, the presence of significant quantities of extracellular matrix components such as collagen, HA and CS in addition to certain growth factors and cytokines makes the conditioned medium well suited for applications involving the skin including aged skin, antiaging for skin, cutaneous wound healing, burns and hair regrowth. Traditionally biomolecules such as collagen and HA have been extraction from primary animal tissue including bovine, avian, and piscine sources. The factor rich UC MSCs derived product disclosed herein provides an alternative human source for these biomolecules. In one embodiment, adult fibroblast cells respond to exposure to the factor rich product by significantly increasing their production of collagen I and elastin. The production and secretion of these factors contributes to the moisture and pliability of adult skin. In some embodiments, the factor rich product is also well suited to applications involving cartilage, ligament, joints and bone and muscle.

EXAMPLES

Figure 1:
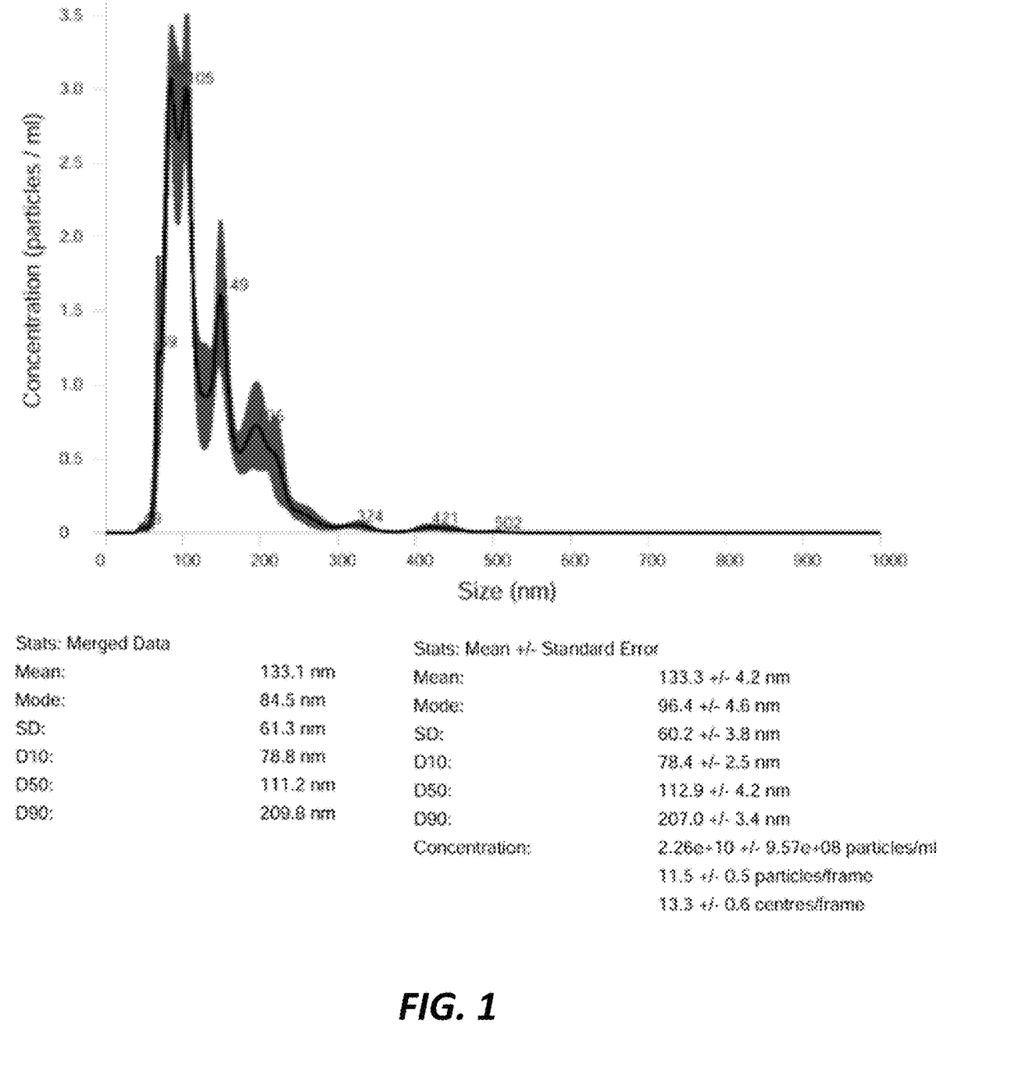
FIG. 1. is a line graph showing concentration of particles in UC MSC conditioned medium as a function of particle size and associated statistical data.

FIG. 1. is a line graph showing exosome size and concentration in UC MSCs conditioned medium wherein 5 lots of a UC MSCs cell line, at passage 3, were cultured in serum and growth factor free medium for 9 days. The conditioned medium was collected every third day and then pooled by lot prior to analysis by the NANOSIGHT system. The figure demonstrates that the UC MSCs CM contains exosomes between 50 and 220 nm and the average particle size was 133.1 nm. The highest concentration are approximately 100 nm exosomes with the total concentration in 9 days of pooled conditioned medium averaging 2.26 e 10+/− 9.57 e 8 particles per ml.

Figure 2:
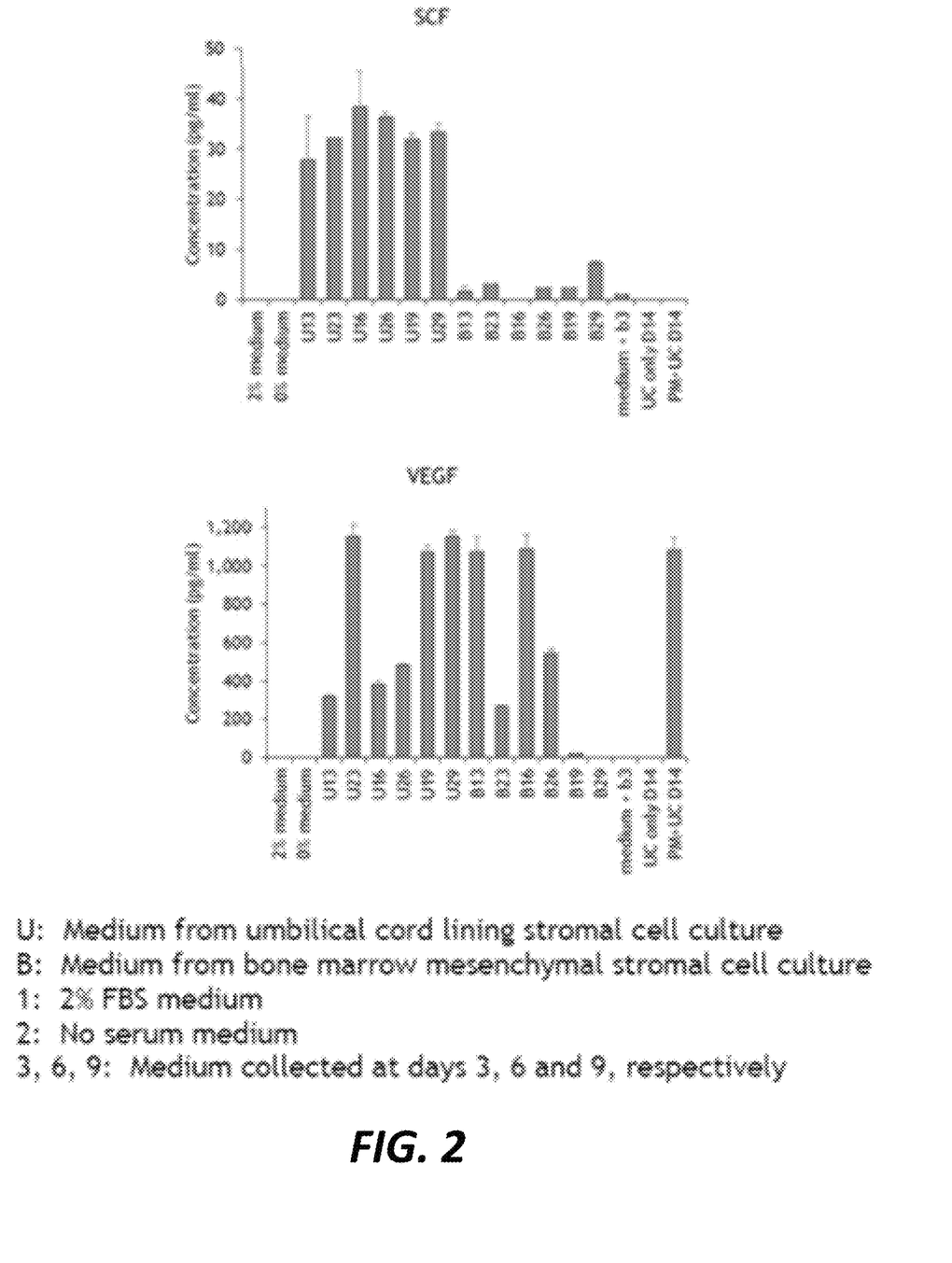
FIG. 2. is a pair of bar charts comparing levels of SCF and VEGF in conditioned medium of UC MSCs and BM MSCs at three time points.

FIG. 2. is a chart comparing levels of SCF and VEGF in the conditioned medium of UC MSCs and BM MSCs at several time points. A UC MSCs cell line and a BM MSCs cell line were cultured in 2% or 0% FBS medium, and collected at 3, 6, 9 days. Conditioned medium was tested by enzyme linked immunosorbent assay (ELISA) for VEGF and SCF and optical density of samples determined by microplate reader at 450 nm within 30 minutes. Gram concentration was determined by reference to a standard curve. The figure demonstrates that UC MSCs secrete SCF at all time points in culture. UC MSCs also continue to make VEGF after six days. UC MSCs make SCF from 20 to 50 picograms per milliliter (pg/ml) in a 3 day interval. VEGF from 200 to 1200 pg/ml in a 3 day interval. UC MSCs production of SCF and VEGF continues up to 9 days.

Figure 3:
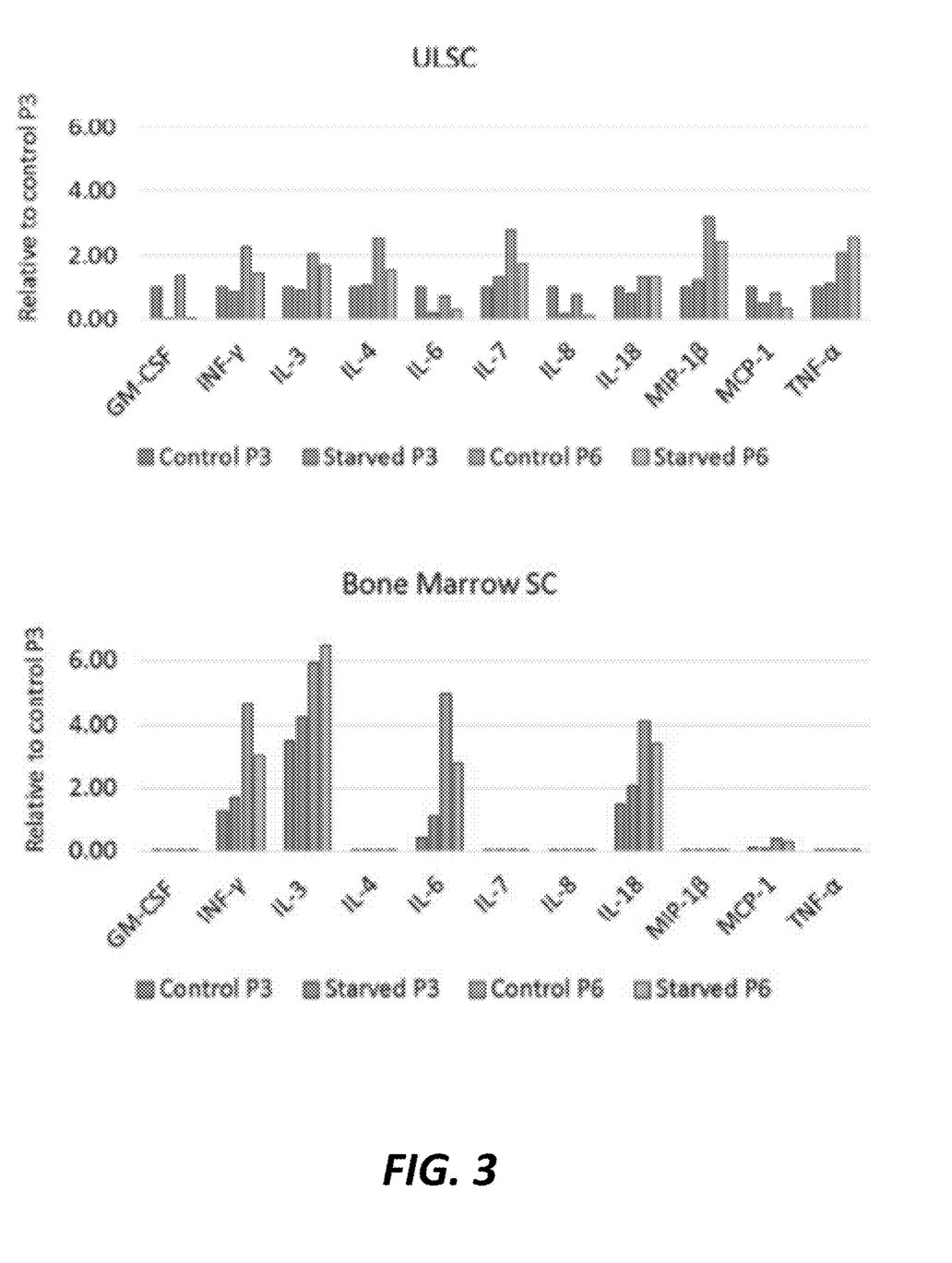
FIG. 3. is a pair of bar charts comparing cytokine and chemokine levels in conditioned medium of UC MSCs and BM MSCs from passages 3 and 6.

FIG. 3 is a chart comparing cytokine and chemokine levels in the conditioned medium of UC MSCs and BM MSCs at passage number 3 and at passage number 6 wherein cell lines were cultured in 15% or 0% FBS medium, and collected at 3, 6, 9 days and pooled by treatment group and passage number at the end. Cells in corresponding wells were counted. Cell culture medium was shipped to Myriad RBM (Austin, TX) to be tested using Human Cytokine-MAP® A v. 1.0 for quantitative representation of GM-CSF, INF-γ, IL-2, IL-3, IL-4, IL-5, IL-6, IL-7, IL-8, IL-10, IL-18, MIP-1α, MIP-1β, MCP-1, TNF-α, TNF-β. Myriad RBM multiplexed assays are based on capture-sandwich format using capture antibodies attached to fluorescently encoded microspheres. After capture of antigen from a biological sample, such as serum or cell culture fluid, the antigen is then detected and quantified using specific detection antibodies coupled to a fluorescent probe. Results obtained from Myriad RBM as weight per volume of each analyte were normalized per number of cells from the corresponding well. The chart demonstrates that UC MSCs contain all of the factors found in BM MSCs including INF-γ, IL-3, 6, 18 and several that are not found or found at lower levels in BM MSCs including GM-CSF, IL-4, 7, 8, MIP-1B, MCP-1 and TNFα. Passage 6 UC MSCs also make more of all these factors than Passage 3.

Figure 4:
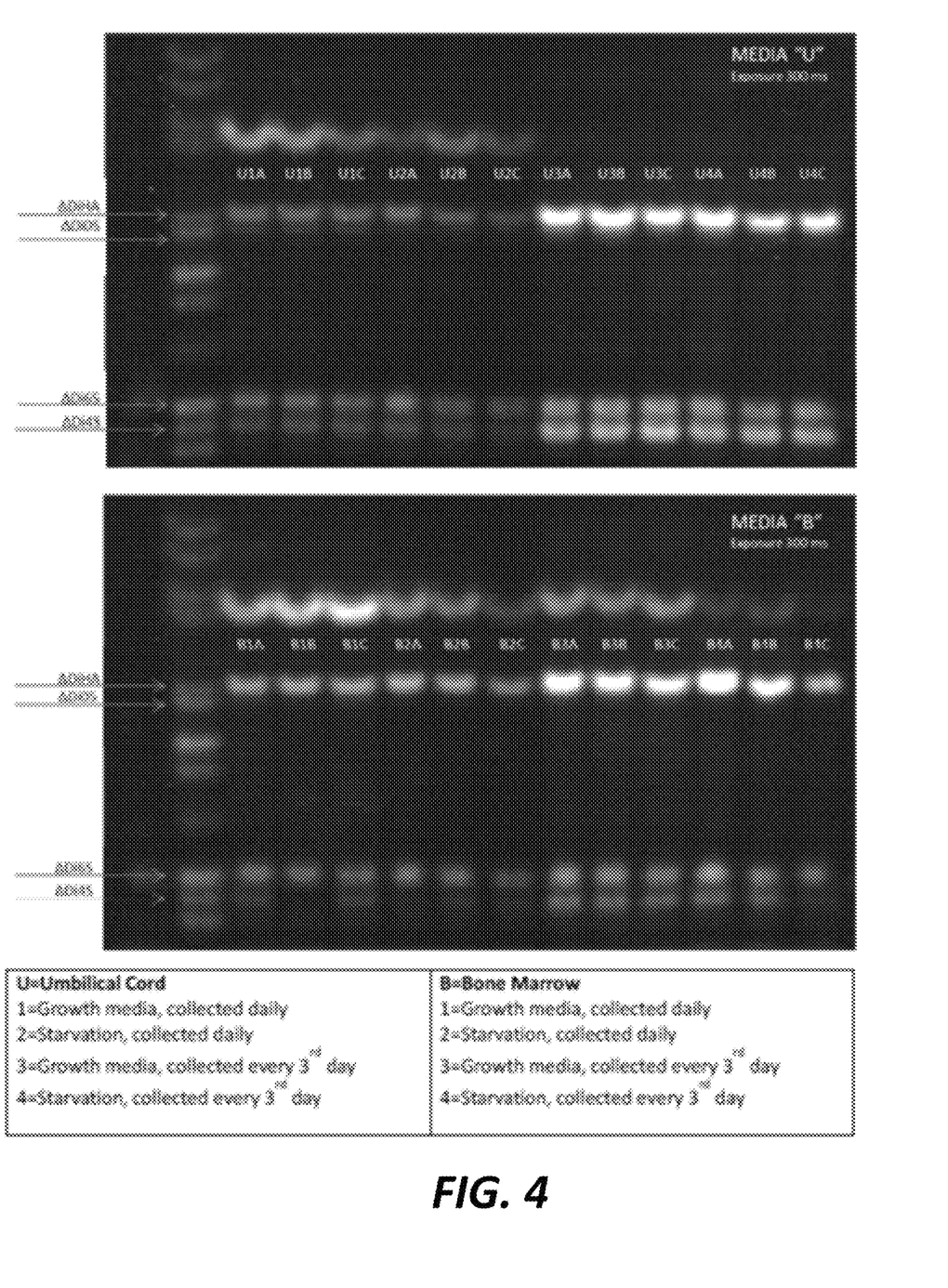
FIG. 4. is a pair of gel documentation system images of a polyacrylamide gel in which GAGs collected from the conditioned medium of UC MSCs and BM MSCs were enzymatically cleaved and separated into constituent monomers.

FIG. 4. is a gel documentation image of a polyacrylamide gel in which HA and CS collected in conditioned medium have been enzymatically cleaved and their constituent monomors separated by electrophoresis. UC MSCs and BM MSCs from passage 3 were grown in either 15% growth or 0% starvation FBS medium, collected daily or every third day from cell cultures in triplicate, A, B, C, and pooled by treatment group and collection day after the last day of collection on day 9. Conditioned medium was filtered, concentrated, treated with proteases and nucleases to remove protein and nucleic acid, then treated with detergent and alcohol to remove lipids, leaving a mixture enriched with complex carbohydrates including glycosaminoglycans (GAGs). The GAGs mixture was then treated with Chondroitinase ABC/Streptomyces Hyaluronidase, which cleaves the GAGs into their constituent monomers, ΔDiHA, ΔDiOS, ΔDi6S and ΔDi4S. The resulting fragments were then treated with mercuric ion, and then fluoro tagged by reductive amination giving an identical fluorescent signal for every free reducing group. The fluoro-tagged products were then electrophoretically separated and scanned by CCD camera and analyzed with quantitative image analysis software (Midura R J et al., *Quantification of hyaluronan (HA) using a simplified fluorophore-assisted carbohydrate electrophoresis* (FACE) *procedure*. Methods Cell Biol. 2018; 143:297-316). The image and analysis show that all CM samples contained HA and CS disaccharides after chondroitinase ABC/hyaluronidase digestion. Samples U3, U4, B3 and B4 contained the highest content of HA followed by B1, B2, U1, and U2. Samples U3, U4, B3 and B4 contained the highest content of CS followed by U1, U2, B1 and B2.

Figure 5:
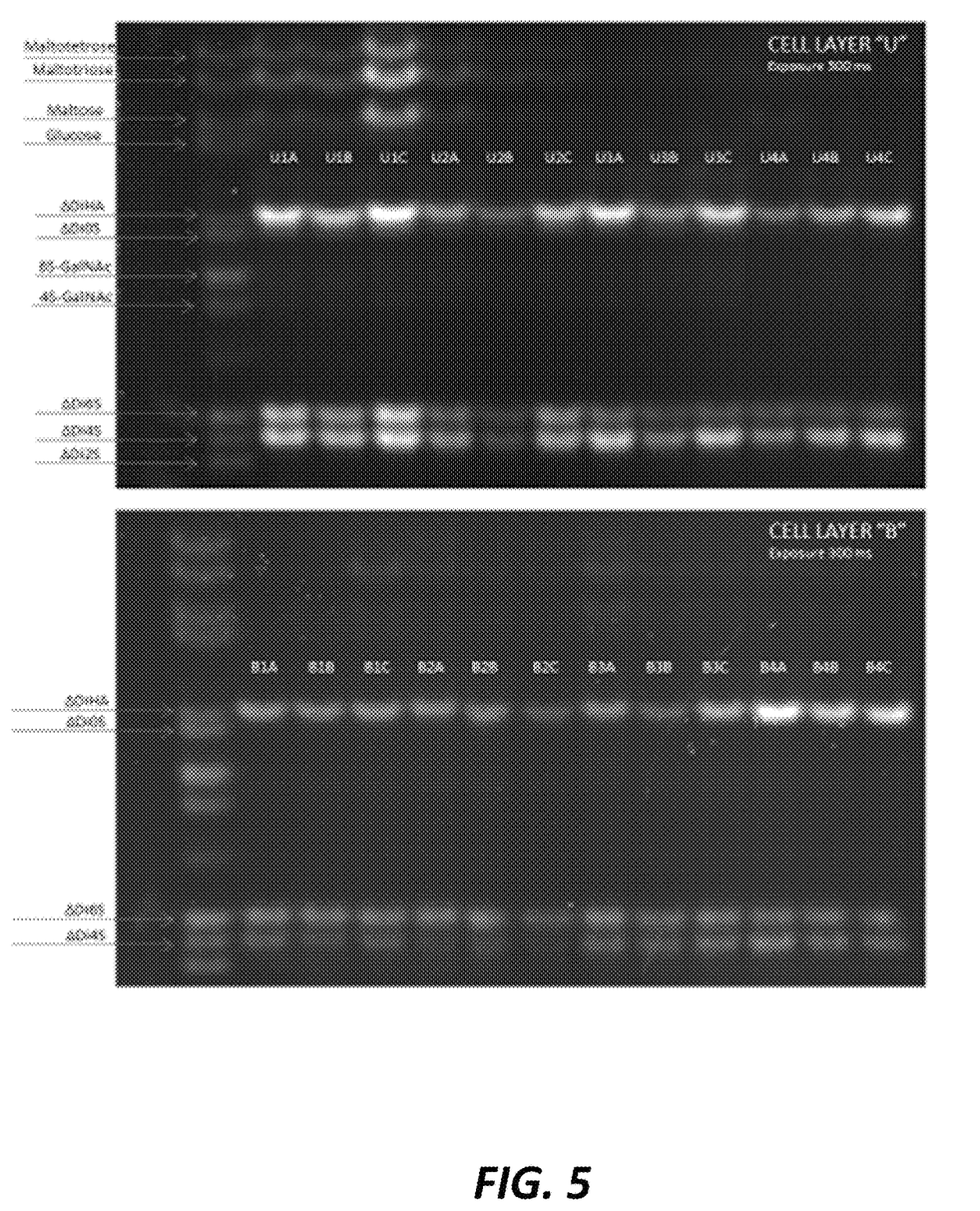
FIG. 5. is a pair of gel documentation system images of a polyacrylamide gel in which GAGs collected from the cell layers of UC MSCs and BM MSCs were enzymatically cleaved and separated into constituent monomers.

FIG. 5 is a gel documentation image of a of polyacrylamide gel in which HA and CS isolated from cell layers have been enzymatically cleaved and their constituent monomors separated by electrophoresis using the protocol described in FIG. 4. The image and analysis show that UC MSCs cell samples tended to yield higher DNA/sample values than the BM MSCs sample values. All cellular extract samples contained HA and CS disaccharides after chondroitinase ABC/hyaluronidase digestion. Samples U1, U3 and B4 contained the highest content of HA (ug/ug DNA) followed by U4, U2, B3, B1 and B2. Samples U1, U3, and U4 contained the highest content of Cs (ug/ug DNA) followed by U2, B4, B1 and B2.

Figure 6:
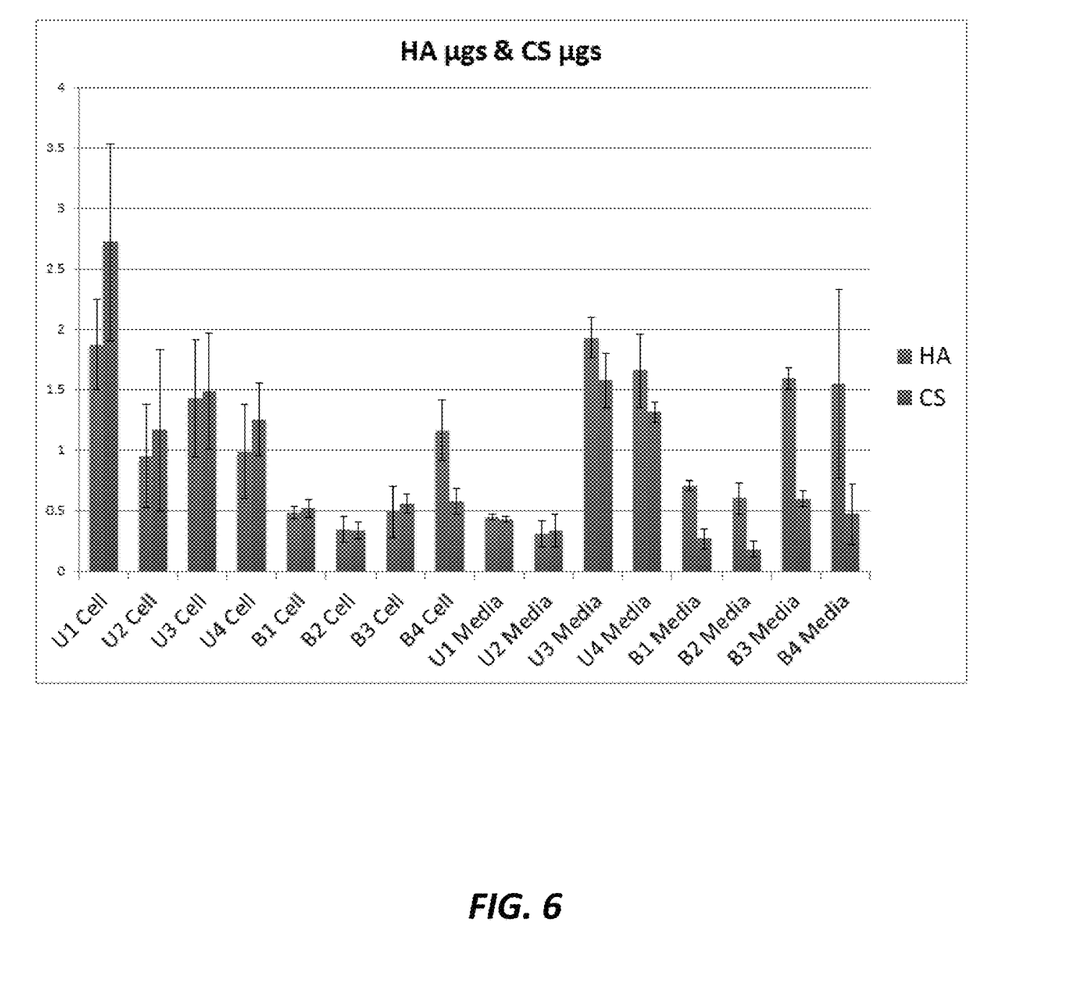
FIG. 6: is a bar chart comparing hyaluronic acid and chondroitin sulfate levels between UC MSCs and BM MSCs conditioned medium and cell layers.

FIG. 6 is a bar chart comparing HA and CS levels between UC MSCs and BM MSCs and their conditioned medium and cell layers. The chart was produced based on the quantitative image analysis of FIGS. 4 and 5. The chart demonstrates there is considerable HA and CS in the medium and cell layer of UC MSCs.

Figure 7:
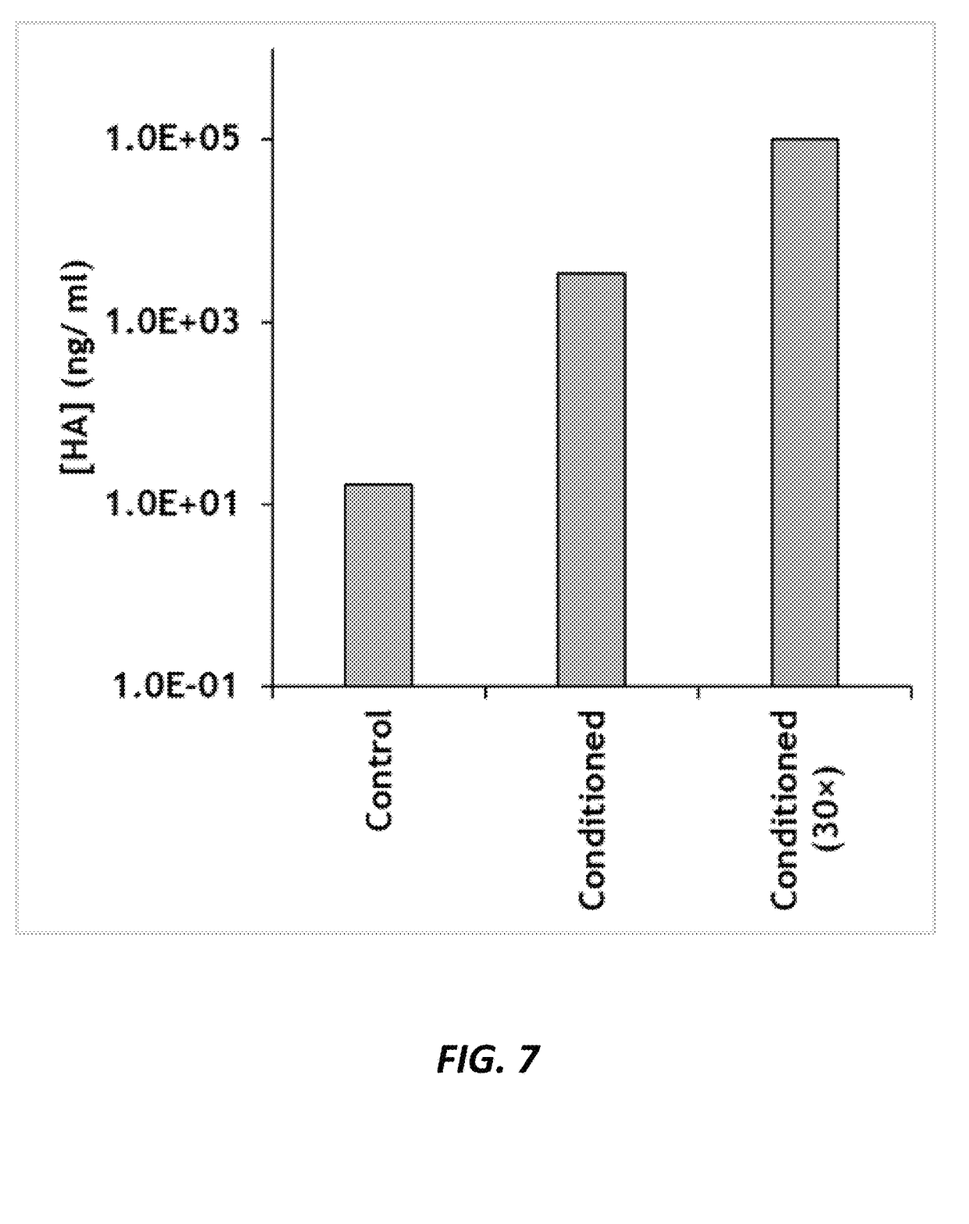
FIG. 7: is a bar chart comparing concentrations of hyaluronic acid in UC MSCs conditioned medium.

FIG. 7 is a bar chart comparing concentrations of HA in UC MSCs control and conditioning medium. A UC MSCs cell line of passage 3 was grown in either 15% growth or 0% FBS medium, collected after 9 days. A quantitative ELISA immunoassay for Hyaluronan was used to quantify HA content of CM. Particulates were removed by centrifugation, stored samples at ≤−20° C., and thawed before running the assay. The assay employs sandwich enzyme technique with recombinant human (rh) Aggrecan pre-coated on the microplate. Standards, controls, and samples were pipetted into the wells and any Hyaluronan present is bound by the coated rhAggrecan. The wells were then washed to remove any unbound substances, enzyme-linked rhAggrecan is added to the wells. Following a wash to remove any unbound rhAggrecan-enzyme reagent, a substrate solution is added to the wells and color develops in proportion to the amount of Hyaluronan bound. Absorbance was then measured in a microplate at wavelength of 450 nm, with the correction wavelength set at 540 nm or 570 nm. The chart demonstrates HA may be recovered from UC MSCs conditioned medium at up to 1 ug/ml before concentration.

Figure 8:
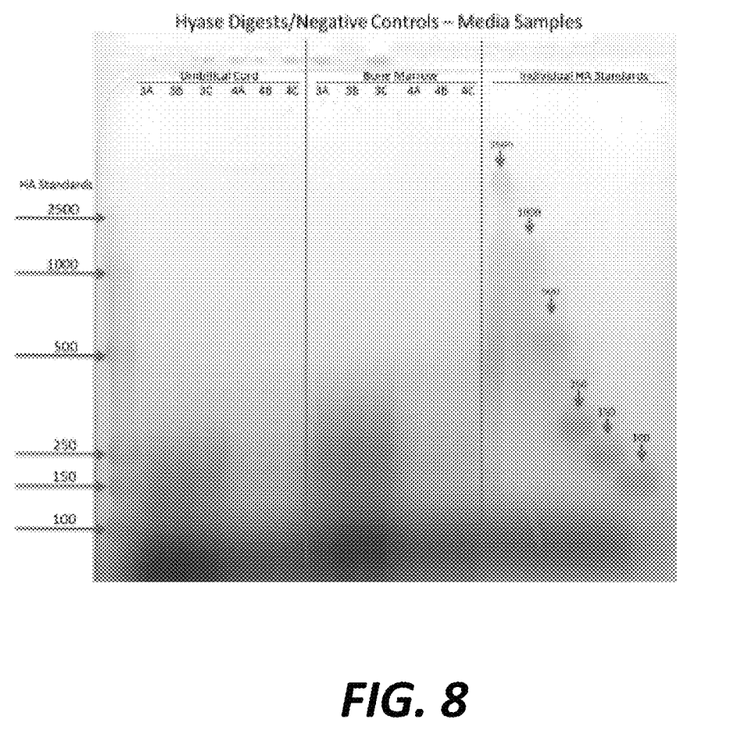
FIG. 8. is a pair of micrographs of a polyacrylamide gel in which HA collected from the conditioned medium of UC MSCs and BM MSCs was separated by size, and enzymatically cleaved and separated in constituent monomers.

FIG. 8 is micrographs of polyacrylamide gels in which HA collected from UC MSCs and BM MSCs conditioned medium was separated by size in the upper image, and enzymatically cleaved and separated by size in the lower image. Passage 3 cell lines for UC MSCs and BM MSCs were grown in either 15% growth ("3") or 0% starvation ("4") FBS medium in triplicate ("A, B, C"). Medium was collected every third day and pooled after 9 days. The HA was isolated for electrophoresis by Proteinase K digestion followed by ethanol precipitation, then nucleic acid digestion, followed by streptomyces hyaluronidase digestion. Digestion products were run out on a gel for separation and then the gel was stained and imaged. The micrograph demonstrates that UC MSCs have high molecular weight HA up to about 2500 kDa.

Figure 9:
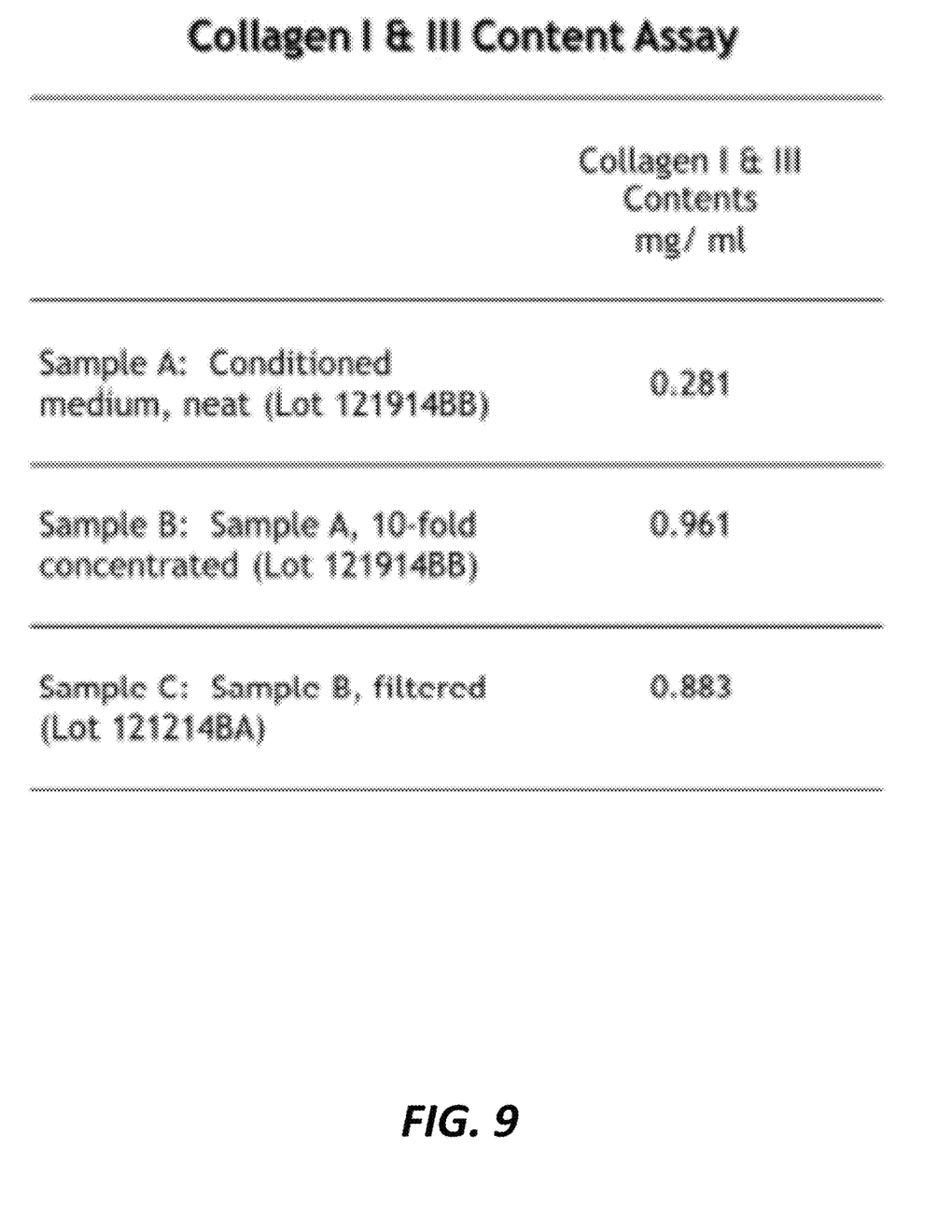
FIG. 9. is a table showing recovery of collagen 1 and 3 from UC MSCs conditioned medium.

FIG. 9. is a table showing recovery of collagen I and III from UC MSC conditioned medium. A UC MSC cell line of passage 3 was grown in 2% fetal bovine serum and 1% ITS conditioned for 2 days by confluent umbilical cord stem cells. Sample B is sample A 10× concentrated by centrifugation. Sample C is sample B filtered through 3MM Whatman paper. Sample A is used as 30, and 31 dilutions; samples B and C are used as 30, 31, 32, and 33 dilutions. The results show that human collagen I and III is present at approximately 0.28 mg/ml in conditioned medium after 2 days of conditioning.

Figure 10:
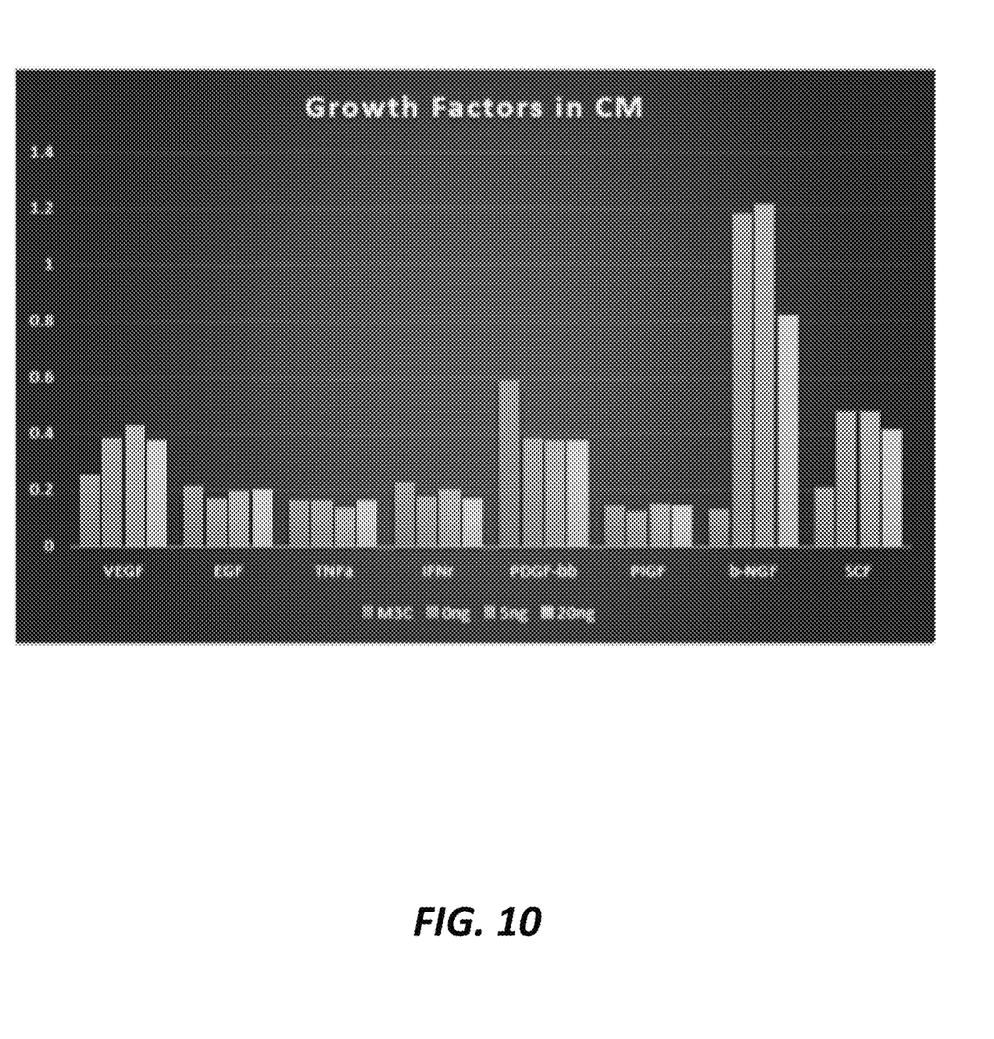
FIG. 10. is a bar chart comparing growth factor levels in conditioned medium of UC MSCs at increasing concentrations of FGF-2.

FIG. 10 is a bar chart comparing the levels of growth factors in conditioned medium supplemented with 15% FBS and increasing levels of FGF-2. A UC MSCs cell line of passage 3 was cultured in 15% FBS, M3 medium supplemented with between 5 and 20 ng FGF-2 and cultured for 3 days before being collected. Conditioned medium was tested by ELISA for levels of different cytokines and human growth factors profiling 8 proteins: VEGF, EGF, TNFα, IFNr, PDGF-BB, PlGF-1, B-NGF, SCF. The conditioned medium was concentrated to 10×. Samples tested were, only medium, conditioned medium collected from cells treated with 0, 5 and 20 ng of FGF-2. To each well of the ELISA strip, 100 µl of sample was added and incubated for one hour with gentle shaking using Jitterbug shaker. Each well was washed with assay buffer. After stopping the reaction to each well, determined the optical density of each well with a microplate reader at 450 nm within 30 minutes. The chart demonstrates a significant increase in secretion for b-NGF, SCF, also VEGF with between 5 and 20 ng FGF-2.

Figure 11:
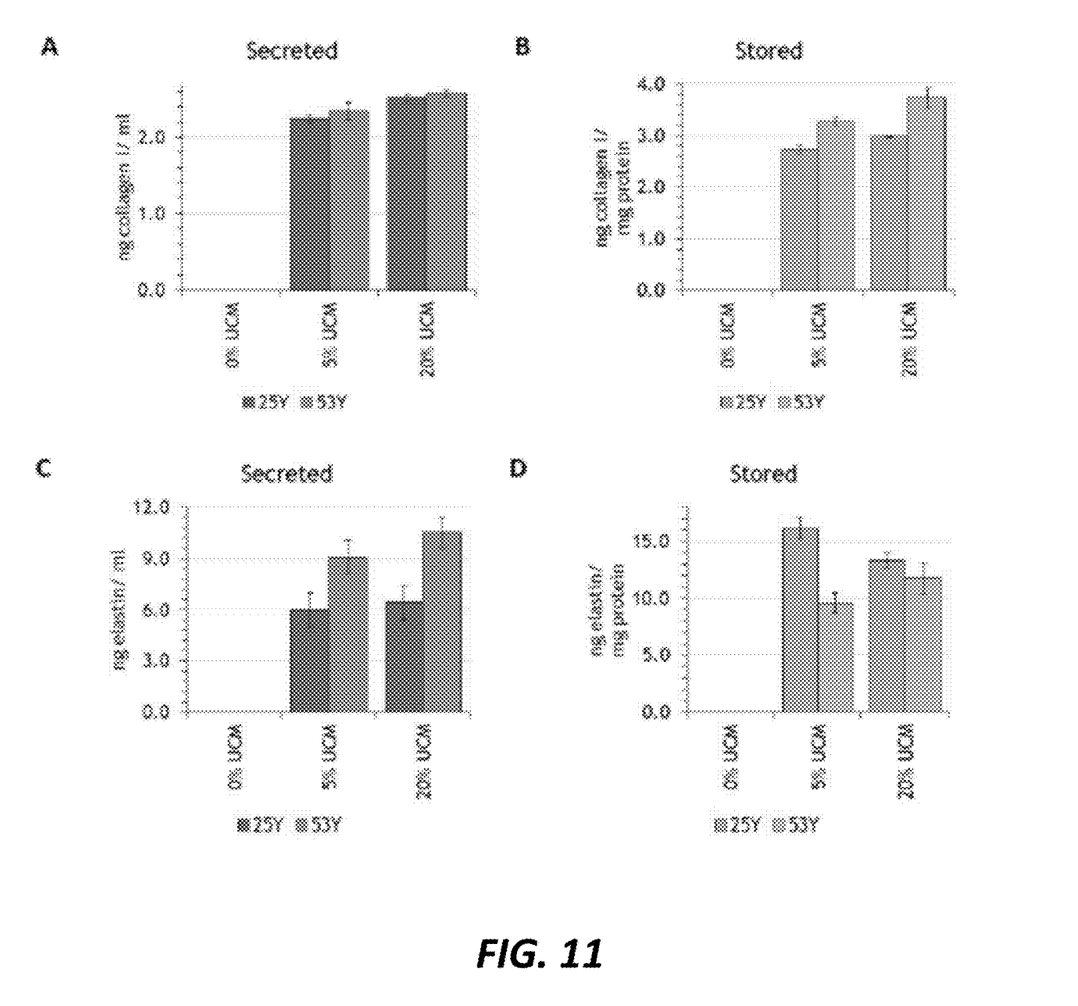
FIG. 11. is a set of bar charts comparing the effect of 5% and 20% factor rich product in a solution applied to skin fibroblasts of two donors.

FIG. 11. is a set of bar charts comparing the effect of 5% and 20% factor rich product in the cell culture medium of adult fibroblasts. Fibroblast cells of two donors, 25 years and 53 years of age, were grown in serum free medium supplemented with either 5% or 20% of the factor rich product for 8 hours. After 8 hours, the factor rich solution was replaced with serum free medium and culture for additional 3 days. Then the medium collected and protein extracted from cells. ELISA was used to assay the levels of collagen I and elastin. The charts demonstrate that exposure of skin fibroblasts to 5 and 20% ULSCs CM product induced significant increase in stored and secreted collagen I and elastin at both ages.

While certain embodiments have been described, these embodiments have been presented by way of example only, and are not intended to limit the scope of the disclosure. Indeed, the novel methods and systems described herein may be embodied in a variety of other forms, Furthermore, various omissions, substitutions and changes in the systems and methods described herein may be made without departing from the spirit of the disclosure. The accompanying claims and their equivalents are intended to cover such forms or modifications as would fall within the scope and spirit of the disclosure.

Features, materials, characteristics or groups described in conjunction, with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover while operations may be depicted in the drawings or described it he specification in particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "'substantially" may refer to an amount that is within less than 10% of, within less than 5% of, within less than 1% of, within less than 0.1% of, and within less than 0.01% of the stated amount, depending on the desired function or desired result.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

The headings provided herein, if any, are for convenience only and do not necessarily affect the scope or meaning of the devices and methods disclosed herein.

What is claimed is:

1. A lyophilized factor rich composition derived from umbilical cord lining stem cells (ULSCs) conditioned medium comprising:
    a) a medium conditioned by ULSCs at a confluence of 80 to 90% without serum, lipids, exogenous growth factors, dexamethasone or antibiotics but including L-alanyl-L-glutamine;
    b) a growth factor selected from the group consisting of stem cell factor (SCF), vascular endothelial growth factor (VEGF), nerve growth factor (NGF) and combinations thereof;
    c) a cytokine or chemokine selected from the group consisting of interferon gamma (IFN-γ), interleukins (IL) IL-3, IL-4, IL-6, IL-7, IL-8, IL-18, macrophage inflammatory protein-1 beta (MIP1B), monocyte chemoattractant protein-1 (MCP1) and tumor necrosis factor alpha (TNFα) and combinations thereof;
    d) a glycosaminoglycan (GAG) selected from the group consisting of hyaluronic acid (HA) and chondroitin sulfate (CS) and combinations thereof; and
    e) a collagen selected from the group consisting of collagen I and collagen III.

2. The composition of claim 1 wherein said SCF and VEGF are present in conditioned medium prior to further concentration at a concentration of at least 50 pg/ml and 1200 pg/ml, respectively.

3. The composition of claim 1, wherein said HA is present in conditioned medium prior to further concentration at a concentration of at least 1.0 μg/ml.

4. The composition of claim 1, wherein said HA is of molecular weight up to about 2500 kDa.

5. The composition of claim 1, wherein said collagen is present in conditioned medium prior to further concentration at a concentration of at least 0.281 mg/ml.

6. The composition of claim 1 wherein the composition is sterile.

* * * * *